UNITED STATES PATENT OFFICE.

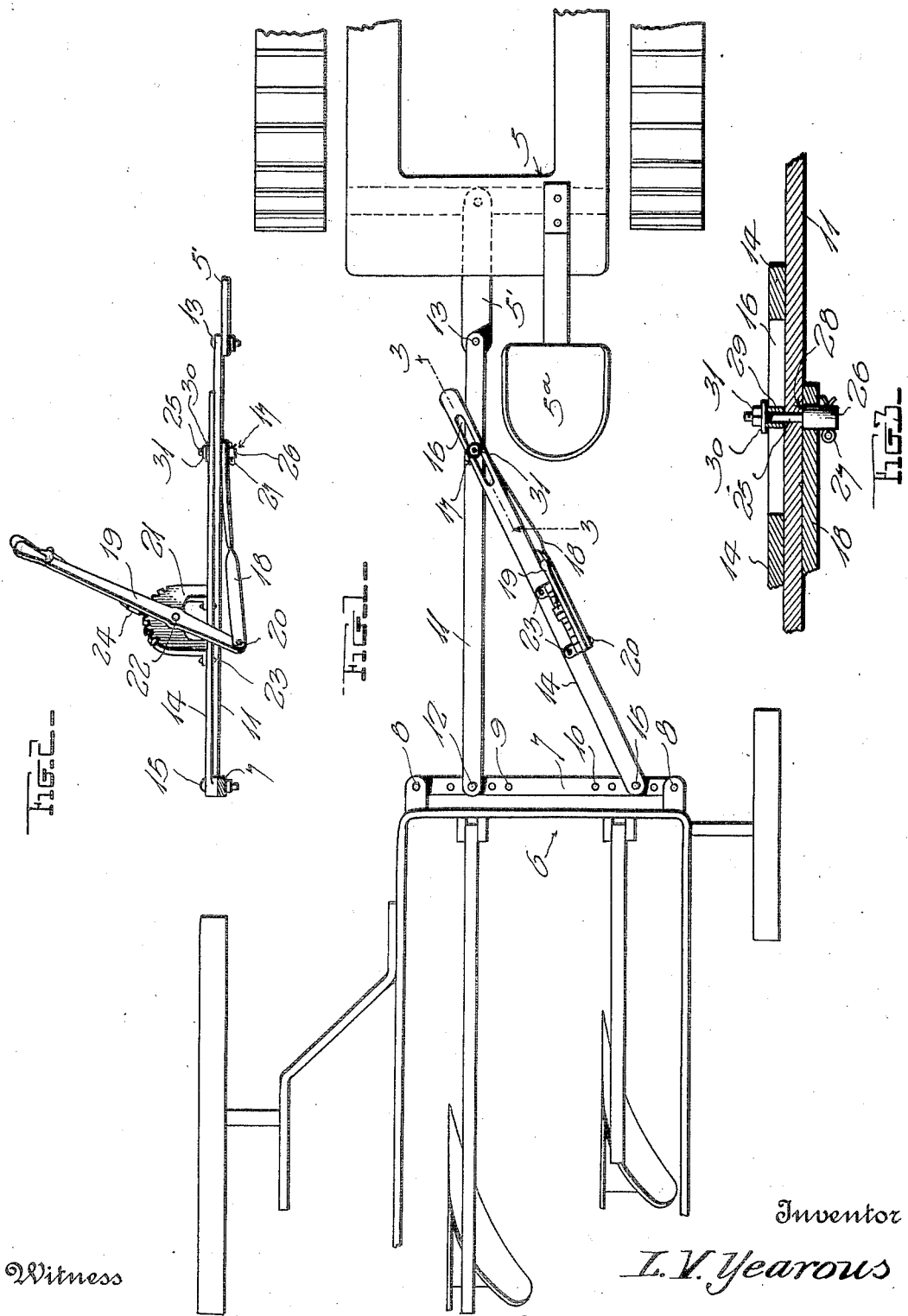

ISAIAH V. YEAROUS, OF CLARINDA, IOWA.

DRAFT-ADJUSTER.

1,319,449.  Specification of Letters Patent.  Patented Oct. 21, 1919.

Application filed June 17, 1918. Serial No. 240,435.

*To all whom it may concern:*

Be it known that I, ISAIAH V. YEAROUS, a citizen of the United States, residing at Clarinda, in the county of Page and State of Iowa, have invented certain new and useful Improvements in Draft-Adjusters; and I do declare the following to be a full, clear, and exact description of the invention, such as will enable others skilled in the art to which it appertains to make and use the same.

This invention relates to draft adjusters, and it relates more particularly to an improved means for determining the path of travel of a gang-plow or other implement to be drawn or trailed by a light tractor or other draft device.

One object of this invention is to provide a draft adjuster with a more convenient and easy adjustment than is provided for other devices of this character;

Another object is to provide a draft adjuster having a greater range of adjustment than other known devices of the kind;

Another object is to provide a draft adjuster which is exceedingly strong and durable and has its working parts where they can be easily reached from the driver's seat, for oiling, these working parts being out of position for collecting sand and grit from the wheels of the implement being trailed;

Another object is to simplify and cheapen the construction by providing a simple and efficient element that forms a combined pivot and guide.

Other objects and advantages may become apparent to persons who read the following details of description in connection with the accompanying drawings, in which:

Figure 1 is a top plan view illustrating my improved draft adjuster in its operative connection with a traction engine and gang plow;

Fig. 2 is a side elevation of my improved draft adjuster; and,

Fig. 3 is an enlarged vertical sectional view along the line 3—3 of Fig. 1.

Referring to these drawings in detail, in which similar reference characters correspond with similar parts throughout the several views, the rear end of a light tractor 5 and a somewhat diagrammatic view of a gang-plow 6 are shown merely to illustrate the use and operation of my invention, and these parts 5 and 6 will not be described in further detail.

The draft adjuster or adjustable draft device which constitutes my invention, consists of a bar 7 which is secured to the gang-plow at 8, is apertured at 9 and 10, and is disposed horizontally and transversely of the path of travel of the traction engine and gang-plow; a draw-bar 11 having its rear end adjustably connected to the transverse bar 7 by means of a bolt or pivot 12 which is interchangeable in the apertures 9, the front end of this draw-bar being pivoted at 13 to the rear end of a pivoted link 5' on the tractor; a brace bar 14 which is connected by a bolt or pivot 15 to the bar 7, the bolt or pivot 15 being interchangeable in the apertures 10, the front of the bar 14 being slotted at 16 and extending diagonally over the front end of the bar 11; a connecting element which is generally designated by the numeral 17 in Figs. 1 and 2 and shown in detail in Fig. 3; an operating link 18 having its front end pivotally connected to the connecting element 17; an adjusting lever 19 which has its lower end pivoted at 20 to the rear end of the link 18; and a toothed segment 21 to which the lever 19 is pivotally secured at 22. The segment 21 is secured by rivets or bolts 23 to the middle portion of the brace bar 14, and an ordinary form of detent 24 is interchangeably engaged with the teeth of the segment 21, for holding the lever 19 in its different adjustments.

The connecting element 17 comprises a shank 25 which has an elongated head 26 at one end and external screw threads at its other end, the head 26 being apertured to receive a cotter pin 27, a shoulder 28 being provided at the connection of the head and shank; a sleeve 29 which extends through the slot 16 and receives the shank 25, the length of this sleeve being slightly greater than the thickness of the bar 14; a washer 30 seated on the sleeve 29; and a nut 31 engaging with the threaded end of the shank 25 and co-operating therewith and with the elements 28, 29 and 30 for clamping the upper and lower sides of the bar 11 through which it extends. It will be seen, therefore, that the connecting element 17 is securely and immovably engaged with the bar 11, that is, the elements 11 and 17 are rigidly united in such relation that the axis of the shank 25 is incapable of being accidentally moved out of its rightangled relation to the length of the bar 11; and therefore the pivot element 26 and guide elements 25, 29 and 30 will not cause undue friction or binding action against movement of the bars 14 and 18 with relation to the bar 11.

The bar 14 crosses over the bar 11 and slides thereon to an extent which may be limited by the length of the slot 16 or the swing of the lever 19, the latter being in rear of the driver's seat which is indicated at 5ª. The parts which have the greatest rubbing movement, viz., the parts 20, 22 and the slotted end of the bar 14, are remote from the wheels of the tractor and of the gang-plow, so that they will not accumulate sand and grit from the wheels, and at the same time, these working parts are within easy reach of the driver on the seat 5ª, so that he may apply oil or other lubricant quickly and conveniently when needed. This feature is a very important one, and is in contradistinction to other known devices of this character, as it not only facilitates the easy operation of adjusting the device but also greatly prolongs the usefulness of the device. Another important feature is that the link 18 is relatively short, and therefore, it need not be heavy in cross section as it would have to be if it were long, for it is well known that a long bar is more easily bent than a short one of equal cross section.

The link 18, being below the bars 11 and 14, necessitates the extension of the lever 19 below the said bars 11 and 14 and this arrangement allows the use of a relatively long and easily operated lever without the necessity for extending the lever above the shoulders of a driver or operator on the seat 5ª, thereby providing the additional important features, viz., maximum convenience and ease of operation.

From the foregoing disclosure, it will be seen that the details of construction and arrangement of this device combine to produce a simple, convenient and thoroughly practical device for the purpose specified. However, it is not intended to limit this invention to these exact details of construction and arrangement of parts, but I am entitled to make minor changes within the scope of the inventive ideas disclosed in the foregoing description and following claim.

What I claim as my invention is:

In a draft adjuster, the combination of a bar adapted to be secured to an implement to be trailed, a draw-bar pivotally connected to the first said bar and being adjustable therealong, a brace bar having its rear end pivotally connected to and terminating at the first said bar and being adjustable therealong and having a slot through its front end portion, a bolt having its shank extending vertically through said draw-bar and through the slot of said brace-bar and having an axially extended head below said draw-bar, a link pivotally connected to said axially extended head, a sleeve on said shank and within said slot to guide the brace-bar, means on said shank co-acting with the head of said bolt and with said sleeve for holding said bolt and sleeve rigid with said draw-bar, said means also securing said brace bar in its sliding engagement with said sleeve, a segment located on the middle part of said brace-bar and thus being remote from the first said bar and from the draw-bar, and a lever pivoted between its ends to said segment and having its lower end pivotally connected to said link and being coöperative with said segment and said bolt for adjusting said draw-bar angularly with relation to the first said bar, whereby the several elements may be conveniently adjusted and whereby the several important features specified are obtained.

In testimony whereof I have hereunto set my hand.

ISAIAH V. YEAROUS.